(12) United States Patent
Teramachi

(10) Patent No.: US 6,261,001 B1
(45) Date of Patent: Jul. 17, 2001

(54) ROLLER GUIDING APPARATUS

(76) Inventor: Hiroshi Teramachi, 3-12-30-301, Kamiosaki, Shinagawa-ku, Tokyo-to (JP)

( * ) Notice: Subject to any disclaimer, the term of this patent is extended or adjusted under 35 U.S.C. 154(b) by 0 days.

(21) Appl. No.: 09/450,591

(22) Filed: Nov. 30, 1999

(51) Int. Cl.⁷ ..................................................... F16C 29/06
(52) U.S. Cl. ............................................................. 384/44
(58) Field of Search ................................. 384/44, 45, 43; 464/168

(56) References Cited

U.S. PATENT DOCUMENTS 5,161,896   11/1992   Hoefling et al. .
5,391,003   2/1995    Ooya .

*Primary Examiner*—Lenard A. Footland

(74) *Attorney, Agent, or Firm*—Wenderoth, Lind & Ponack, L.L.P.

(57) ABSTRACT

A guide rail (21) has an upper surface (26) with a pair of upper rolling paths (23) and side surfaces (70) with a pair of side rolling paths (24). The upper rolling paths (23) are concave surfaces inclined downward toward a longitudinal middle portion with respect to width of the guide rail (21) and extending along arcs of a circle. A moving block (22), provided with a groove (39) receiving the guide rail (21) therein, is mounted on the guide rail (21) so as to straddle the rail. A plurality of upper rollers (35) are supported in rows on the moving block (22) so as to roll along the upper rolling paths (23). The upper rollers (35) each has a convex side surface (35a). A plurality of side rollers (36) are supported in rows on the moving block (22) so as to roll along the side rolling paths (24). Even if a lateral force acts on the moving block due to a positional error in the guide rail, the rollers are able to roll smoothly and the smooth traveling of the moving block is insured.

22 Claims, 8 Drawing Sheets

ROLLER GUIDING APPARATUS

BACKGROUND OF THE INVENTION

1. Field of the Invention

The present invention relates to a roller guiding apparatus to be incorporated into a machine tool etc.

2. Description of the Related Art

The applicant of the present application previously developed a roller guiding apparatus shown in FIG. 8 to be incorporated into a machine tool. This roller guiding apparatus has a guide rail 3 provided with upper rolling paths 1 in its upper surface and with side rolling paths 2 in its side surfaces, a moving block 8 having an upper portion 4 provided with rolling paths 6 corresponding to the upper rolling paths 1 and side portions 5 extending vertically downward from the upper portion 4 and provided with rolling paths 7 corresponding to the side rolling paths 2, upper rollers 9 retained on the upper portion 4 of the moving block 8 so as to roll along the upper rolling paths 1 of the guide rail 3, and side rollers 10 retained on the side portions 5 of the moving block 8 so as to roll along the side rolling paths 2 of the guide rail 3. The moving block 8 supported by the upper rollers 9 and the side rollers 10 on the guide rail 3 moves along the guide rail 3.

The entire upper surface of the guide rail 3 of the roller guiding apparatus is flat and the upper rolling paths 1 are parallel to the upper surface. The side rolling paths 2 are flat and inclined surfaces which are inclined to the upper surface of the guide rail 3. The rolling paths 6 formed in the upper portion of the moving block 8 so as to correspond to the upper rolling paths 1 of the guide rail 3 are flat surfaces which are parallel to the upper rolling paths 1. The rolling paths 7 formed in the side portions 5 so as to correspond to the side rolling paths 2 of the guide rail 3 are flat and inclined surfaces which are parallel to the side rolling paths 2. The rollers 9 and 10 retained on the upper portion 4 and the side portions 5, respectively, of the moving block 8 are cylindrical rollers.

Generally, a plurality of roller guiding apparatuses, for example, four roller guiding apparatuses, are incorporated into a machine tool to support an object.

In the foregoing known roller guiding apparatus, the cylindrical rollers 9 and 10 retained on the upper portion 4 and the side portions 5, respectively, of the moving block 8 roll along the flat upper rolling paths 1 formed in the upper surface of the guide rail 3 and the flat side rolling paths 2 formed in the side surfaces of the guide rail 3, respectively, as the moving block 8 moves along the guide rail 3.

When a lateral force, i.e., a force acting in a direction perpendicular to the guide rail 3, acts on the moving block 8 due to a positional error in installing the guide rail 3 and the moving block 8 is displaced laterally relative to the guide rail 3, the cylindrical rollers 9 and 10 are tilted. Consequently, end surfaces of the cylindrical rollers 9 and 10 come into irregular contact with side surfaces defining the flat rolling paths 1 and 2 and the cylindrical rollers 9 and 10 are unable to roll smoothly. If the guide rail 3 meanders slightly, the moving block 8 is unable to move smoothly. Thus, this known roller guiding apparatus does not have sufficient ability necessary to deal properly with problems that arise when a lateral force is applied to the moving block 8.

The flat upper rolling paths 1 and the flat side rolling paths 2 of the foregoing roller guiding apparatus are bottom surfaces of grooves. Therefore end surfaces of the cylindrical rollers 9 and 10, and the side surfaces of the grooves defining the flat upper rolling paths 1 and the flat side rolling paths 2 must accurately be formed, which increases the manufacturing cost.

The moving block 8 of the foregoing roller guiding apparatus is formed of steel. Therefore, through holes for receiving the rollers 9 and 10 therein must be formed in the moving block 8 by machining. When forming the through holes by machining, pilot holes are formed in the moving block 8 and then the pilot holes are machined in a desired shape by broaching. Thus, the through holes are formed by several machining steps. The pilot holes must be formed straight with a high machining accuracy.

Accordingly, it is difficult to manufacture this known roller guiding apparatus at high productivity.

SUMMARY OF THE INVENTION

The present invention has been made in view of the foregoing problems and it is therefore an object of the present invention to provide a roller guiding apparatus comprising a guide rail, a moving block guided for movement by the guide rail and rollers supporting the moving block on the guide rail, and capable of insuring the smooth rolling of the rollers and the smooth movement of the moving block even when a lateral force is applied to the moving block due to a positional error which was produced during the installation of the guide rail.

A roller guiding apparatus according to the present invention comprises: a guide rail having an upper surface, side surfaces, a pair of upper rolling paths formed in opposite side regions of the upper surface, and a pair of side rolling paths formed in the side surfaces, the upper rolling paths being formed as a pair of concave surfaces declining toward a middle portion of the guide rail with respect to a width, the concave surfaces extending along arcs of a common circle; a moving block provided with a groove receiving therein the guide rail, the moving block being mounted on the guide rail so as to be able to move along the guide rail; a plurality of upper rollers arranged in rows on the moving block so as to roll along the upper rolling paths, each of the upper rollers having a convex side surface; and a plurality of side rollers arranged in rows on the moving block so as to roll along the side rolling paths.

Preferably, the side rolling paths are formed as a pair of convex surfaces extending along arcs of a common circle, and each of the side rollers has a concave side surface.

Preferably, the roller guiding apparatus further comprises: upper retainers for retaining the upper rollers in rows, and side retainers for retaining the side rollers in rows.

Preferably, the roller guiding apparatus further comprises: a retainer holding member formed on a lower portion of the moving block, the retainer holding member having spaces formed at positions corresponding to the upper rolling paths to receive the upper rollers retained by the upper retainers therein and spaces formed at positions corresponding to the side rolling paths to receive the side rollers retained by the side retainers therein.

Preferably, each of rotating axes of the upper rollers is inclined downward toward a longitudinal middle plane passing the middle portion of the guide rail at an angle of 45° to a plane perpendicular to the longitudinal middle plane.

Preferably, each of rotating axes of the side rollers is inclined downward toward the longitudinal middle plane at an angle of 45° to a plane perpendicular to the longitudinal middle plane.

Preferably, the upper rollers and the side rollers are disposed opposite to each other.

Preferably, the side rolling paths are formed as a pair of concave surfaces, and each of the side rollers having a convex side surface.

Preferably, the roller guiding apparatus further comprises: upper retainers for retaining the upper rollers in rows, and side retainers for retaining the side rollers in rows.

Preferably, the roller guiding apparatus further comprises: a retainer holding member formed on a lower portion of the moving block, the retainer holding member having spaces formed at positions corresponding to the upper rolling paths to receive the upper rollers retained by the upper retainers therein and spaces formed at positions corresponding to the side rolling paths to receive the side rollers retained by the side retainers therein.

Preferably, each of rotating axes of the upper rollers is inclined downward toward a longitudinal middle plane passing the middle portion of the guide rail at an angle of 45° to a plane perpendicular to the longitudinal middle plane.

Preferably, each of rotating axes of the side rollers is inclined downward toward the longitudinal middle plane at an angle of 45° to a plane perpendicular to the longitudinal middle plane.

Preferably, the upper rollers and the side rollers are disposed opposite to each other.

Preferably, each of rotating axes of the upper rollers is inclined downward toward a longitudinal middle plane passing the middle portion of the guide rail at an angle of 30° to a plane perpendicular to the longitudinal middle plane.

Preferably, each of rotating axes of the side rollers is inclined downward toward the longitudinal middle plane at an angle of 45° to a plane perpendicular to the longitudinal middle plane.

Preferably, the upper rollers and the side rollers are disposed opposite to each other.

Preferably, the side rolling paths are formed as a pair of flat planes inclined downward toward a longitudinal middle plane passing the middle portion of the guide rail, and each of the side rollers has a straight side surface.

Preferably, the roller guiding apparatus further comprises: upper retainers for retaining the upper rollers in rows, and side retainers for retaining the side rollers in rows.

Preferably, the roller guiding apparatus further comprises: a retainer holding member formed on a lower portion of the moving block, the retainer holding member having spaces formed at positions corresponding to the upper rolling paths to receive the upper rollers retained by the upper retainers therein, and spaces formed at positions corresponding to the side rolling paths to receive the side rollers retained by the side retainers therein.

Preferably, each of rotating axes the upper rollers is inclined downward toward a longitudinal middle plane the middle portion of the guide rail at an angle of 45° to a plane perpendicular to the longitudinal middle plane.

Preferably, each of rotating axes of the side rollers is inclined downward toward the longitudinal middle plane at an angle of 45° to a plane perpendicular to the longitudinal middle plane.

Preferably, the upper rollers and the side rollers are disposed opposite to each other.

DESCRIPTION OF THE PREFERRED EMBODIMENTS

Preferred embodiments of the present invention will be described hereinafter with reference to the accompanying drawings.

Figure 1:
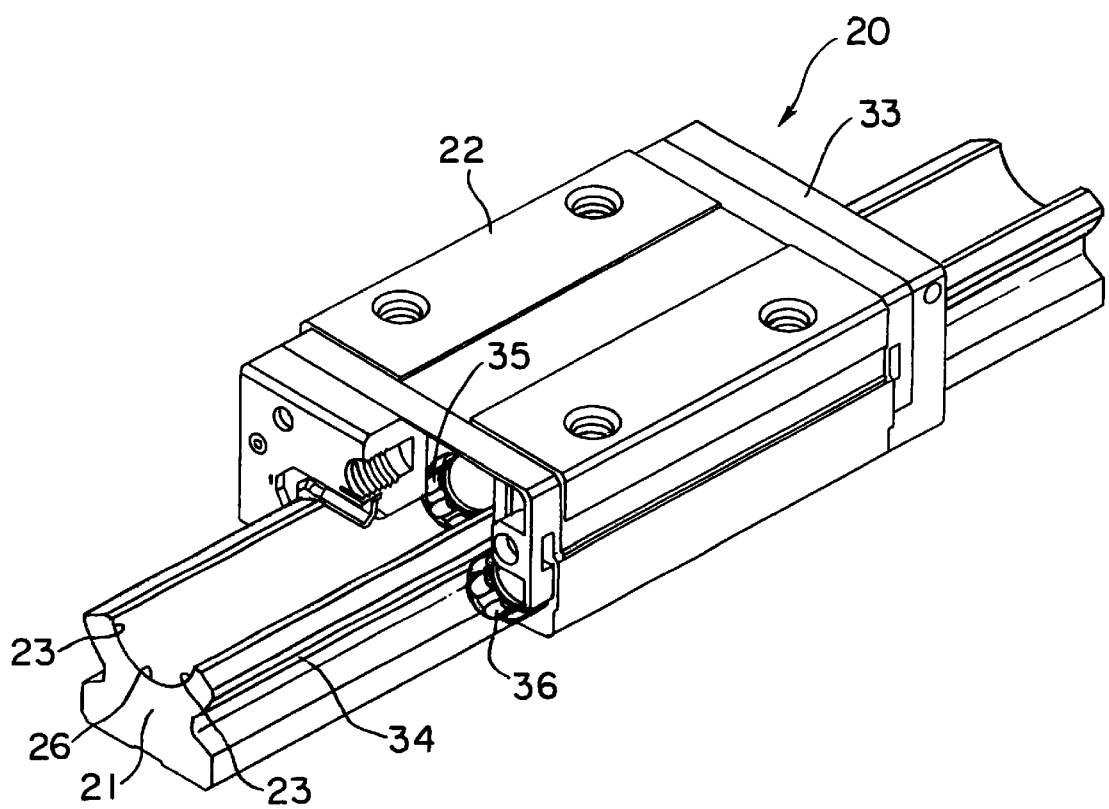
FIG. 1 is a perspective view of a roller guiding apparatus in a first embodiment according to the present invention with some parts thereof removed.

FIG. 1 is a perspective view of a roller guiding apparatus in a first embodiment according to the present invention.

Figure 2:
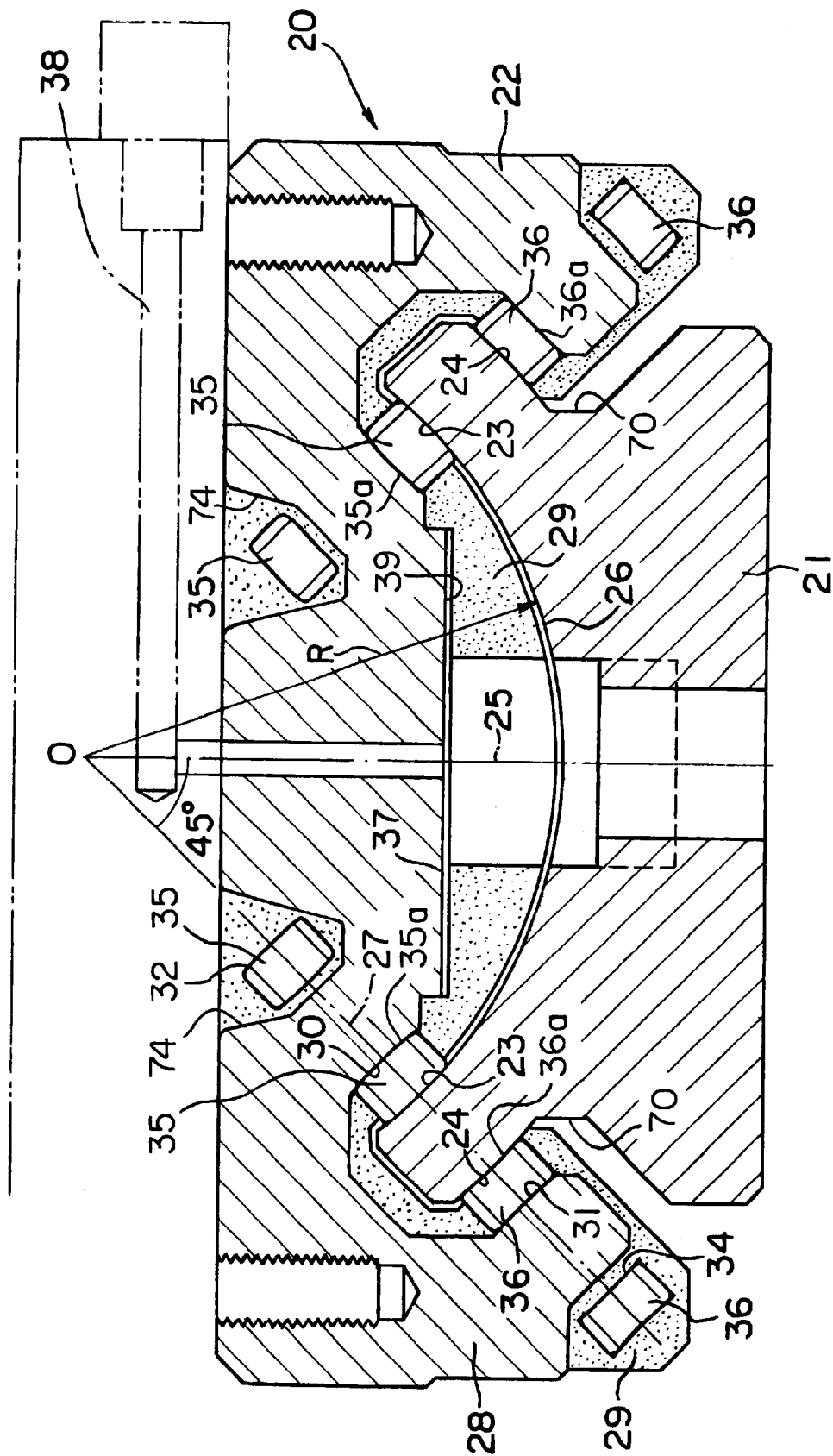
FIG. 2 is a cross-sectional view of the roller guiding apparatus in accordance with the present invention.
Figure 3:
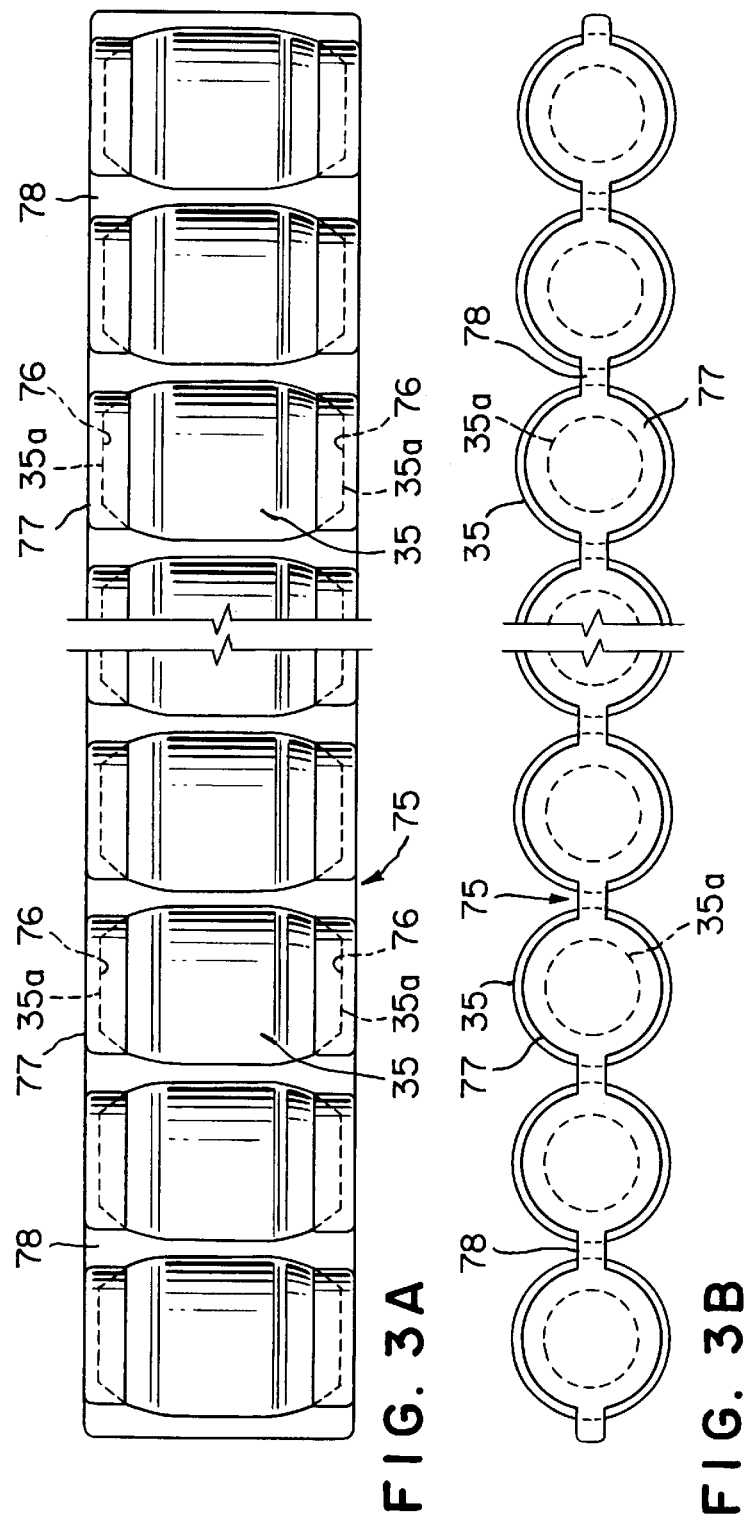
FIG. 3A is a plan view of a plurality of rollers retained by a retainer in the roller guiding apparatus in accordance with the present invention.
FIG. 3B is a side elevation of a plurality or rollers retained by the retainer in the roller guiding apparatus in accordance with the present invention.
FIG. 3C is an end view of the rollers retained by the retainer in the roller guiding apparatus in accordance with the present invention.
Figure 4:
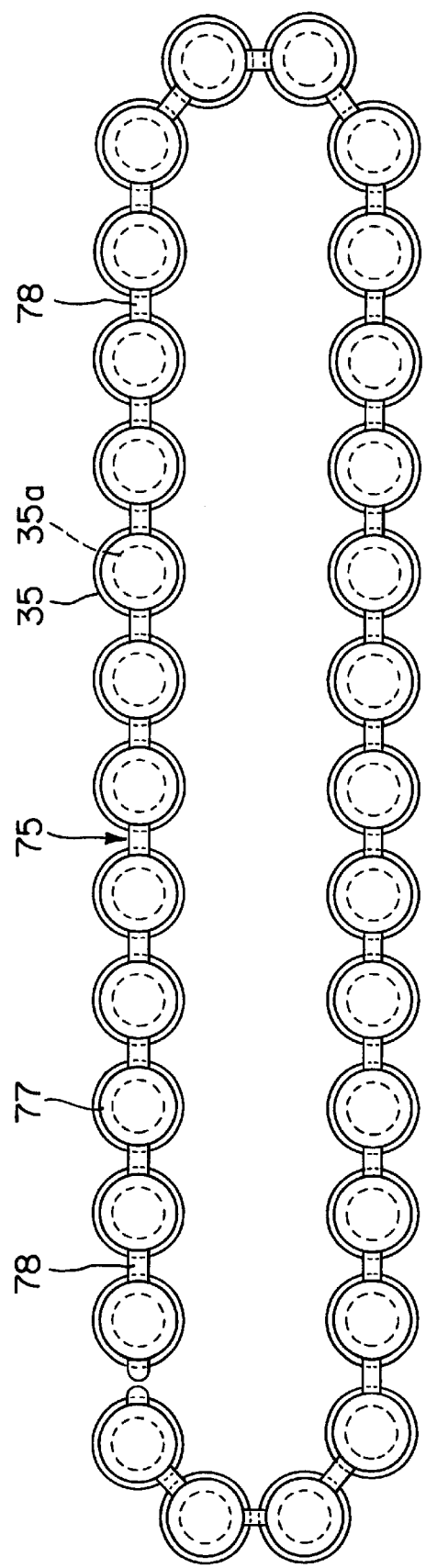
FIG. 4 is a side elevation of an endless arrangement of the rollers retained by a retainer in the roller guiding apparatus in accordance with the present invention.

Referring to FIGS. 1 and 2, a roller guiding apparatus 20 in accordance with the present invention has a horizontal guide rail 21, and a moving block 22 mounted on the guide rail 21 so as to straddle the guide rail 21 for movement along the guide rail 21. A recess 39 is formed in a lower surface of the moving block 22. The recess 39 extends over the guide rail 21 so as to receive the guide rail 21 therein.

As shown in FIGS. 1 and 2, the guide rail 21 is provided with upper rolling paths 23 formed in opposite side regions of its upper surface 26, and side rolling paths 24 formed in regions of its side surfaces 70. The upper rolling paths 23 are concave surfaces included in a cylindrical plane including the upper surface 26 extending along an arc of a circle of a radius R having its center at a point O. This point O is on a vertical and longitudinal middle plane 25 extending through the middle of the guide rail 21 with respect to width. The side rolling paths 24 formed in the side surfaces 70 of the guide rail 21 are convex surfaces included in a cylindrical plane coaxial with the cylindrical plane including the upper surface 26 including the upper rolling paths 23.

As shown in FIG. 2, an inclined plane 27 inclined at 45° to the longitudinal middle plane 25 intersects each concave upper rolling path 23 and each convex side rolling path 24 of the guide rail 21. The concave upper rolling path 23 and the corresponding convex side rolling path 24 are parallel to each other and lie on the same radius. The respective rotational axes of the upper rollers 35 and the side rollers 36 are inclined downward toward the longitudinal middle plane 25 at an angle of 45° to a plane perpendicular to the longitudinal middle plane 25.

The moving block 22 has a main body 28 made of iron material, and a retainer holding member 29 formed on a lower portion of the main body 28. The retainer holding member 29 is formed by molding a synthetic resin, such as Derlin, and is combined with the main body 28 by insert molding. The retainer holding member 29 is provided with spaces 30 for receiving the upper rollers 35 that roll along the concave upper rolling paths 23, and spaces 31 for receiving the side rollers 36 that roll along the convex side rolling paths 24.

The retainer holding member 29 is combined with the lower portion of the main body 28 by molding so as to form the spaces 30 and 31 for receiving the rollers therein. Therefore, any through holes for receiving the rollers need not be formed in the moving block 22 by machining and any machining cost for forming the holes are not necessary.

The spaces 30 and 31 formed in the retainer holding member 29 of the moving block 22 correspond to the upper rolling paths 23 and the side rolling paths 24, respectively, of the guide rail 21, when the moving block 22 is mounted on the guide rail 21 so as to straddle the guide rail 21. Rollers retained in rows by retainers are arranged in the spaces 30 and 31, respectively.

Referring to FIGS. 3A, 3B, 3C and 4, a retainer 75 has a plurality of pairs of support members 77. Each pair of support members 77 have recesses 76 for rotatably receiving opposite end portions 35a of the upper roller 35, respectively. Adjacent ones of the longitudinally arranged support members 77 of the retainer 75 are connected by flexible connecting members 78. Although the retainer 75 retaining the upper rollers 35 are explained by way of example with reference to FIGS. 3A, 3B, 3C and 4, the side rollers 36 and rollers 45, 55 and 65 employed in other embodiments which will be described later are retained by retainers similar to the retainer 75 illustrated in FIGS. 3A, 3B, 3C and 4.

Each of the spaces 30 of the retainer holding member 29 is connected by connecting spaces formed respectively in end plates 33 (one of the end plates 33 is removed in FIG. 1) to a space 74 formed in the main body 28 of the moving block 22 to form an upper roller circulating passage. The space 74 is intercepted by the inclined plane 27 and lies on the radially inner side of the space 30. In the upper roller circulating passage, the space 30 is a loaded roller moving section and the space 74 is a nonloaded roller moving section.

Similarly, each of the spaces 31 of the retainer holding member 29 is connected by connecting spaces formed respectively in the end plates 33 to a space 34 to form a side roller circulating passage. The space 34 is intercepted by the inclined plane 27 and lies on the radially outer side of the space 31. In the side roller circulating passage, the space 31 is a loaded roller moving section and the space 34 is a nonloaded roller moving section.

The upper rollers 35 each having a convex side surface 35a complementary to the concave upper rolling path 23 are arranged in each of the upper roller circulating passages including the concave upper rolling path 23 of the moving block 22. The upper rollers 35 are retained in a row by the retainer 75 to form an endless upper roller chain. The endless upper roller chain is placed in the upper roller circulating passage. The retainer 75 of the upper roller chain is fitted in a retainer supporting groove, not shown, formed in the upper roller circulating passage to ensure that the upper rollers 35 rotate normally.

The side rollers 36 each having the concave side surface 36a complementary to the convex side rolling path 24 are arranged in each of the side roller circulating passages including the convex side rolling path 24 of the moving block 22. The side rollers 36 are retained in a row by a retainer 75 to form an endless side roller chain. The endless side roller chain is placed in the side roller circulating passage. The retainer 75 of the side roller chain is fitted in a retainer supporting groove, not shown, formed in the side roller circulating passage to ensure that the side rollers 36 rotate normally.

A closed space 37 is formed between the lower portion of the main body 28 and the retainer holding member 29. The closed space 37 is connected to a hydraulic circuit 38 included in the roller guiding apparatus 20. When a working fluid is supplied by pressure to the hydraulic circuit 38, the working fluid presses the retainer holding member 29 toward the guide rail 21 to press the lower surface of the retainer holding member 29 against the upper surface of the guide rail 21. Consequently, the retainer holding member 29 is brought into frictional engagement with the guide rail 21 to stop the moving block 22 at a desired position on the guide rail 21 and to restrain the moving block 22 from free movement. The hydraulic circuit 38 may be provided with a sensor, not shown, and the pressure of the working fluid may be varied according to the magnitude of vibration of the apparatus.

The operation of the roller guiding apparatus will be described hereinafter.

The upper rollers 35 each having the convex side surface 35a are disposed on the moving block 22 so as to roll along the concave upper rolling paths 23 of the guide rail 21. The side rollers 36 each having the concave side surface 36a are disposed on the moving block 22 so as to roll along the convex side rolling paths 24 of the guide rail 21. The moving block moves along the guide rail 21.

If a lateral force is applied to the moving block 22 due to slight meandering of the guide rail resulting from a positional error in the guide rail 21 while the moving block 22 is moving along the guide rail 21, the moving block 22 is forced to move laterally in a limited range without tilting the upper rollers 35 and the side rollers 36. This is because the convex side surfaces 35a of the upper rollers are in contact with the concave upper rolling paths 23 of the guide rail 21, and the concave side surfaces 36a of the side rollers 36 are in contact with the convex side rolling paths 24.

When the lateral force acting on the moving block 22 is removed from the moving block 22 after the moving block 22 was laterally shifted on the guide rail 21, the moving block 22 is returned automatically to its initial position by the combined effect of its own weight and a vertical load supported by the moving block 22.

Since the retainers 75 retaining the upper rollers 35 and the side rollers 36 are fitted in the retainer supporting grooves formed in the upper and side roller circulating passages, respectively, the respective rotational axes of the rollers 35 and 36 are not turned from a direction perpendicular to the moving direction of the rollers 35 and 36 even if the moving block 22 is shifted laterally while the moving block 22 is moving and, therefore, the rollers 35 and 36 are able to roll smoothly along the rolling paths 23 and 24, respectively.

Since the upper rolling paths 23 and the side rolling paths 24 are declined toward the longitudinal middle plane 25 extending through the middle of the guide rail 21 with respect to width at an angle of 45° to a plane perpendicular to the longitudinal middle plane 25, a perpendicular load (vertical load) and a lateral load (horizontal load) on the moving block 22 are equal. This configuration is advantageous to calculate the load on the roller guiding apparatus and to determine the design of the roller guiding apparatus.

FIGS. 5 to 8 show roller guiding apparatus in second, third and fourth embodiments according to the present invention.

Figure 5:
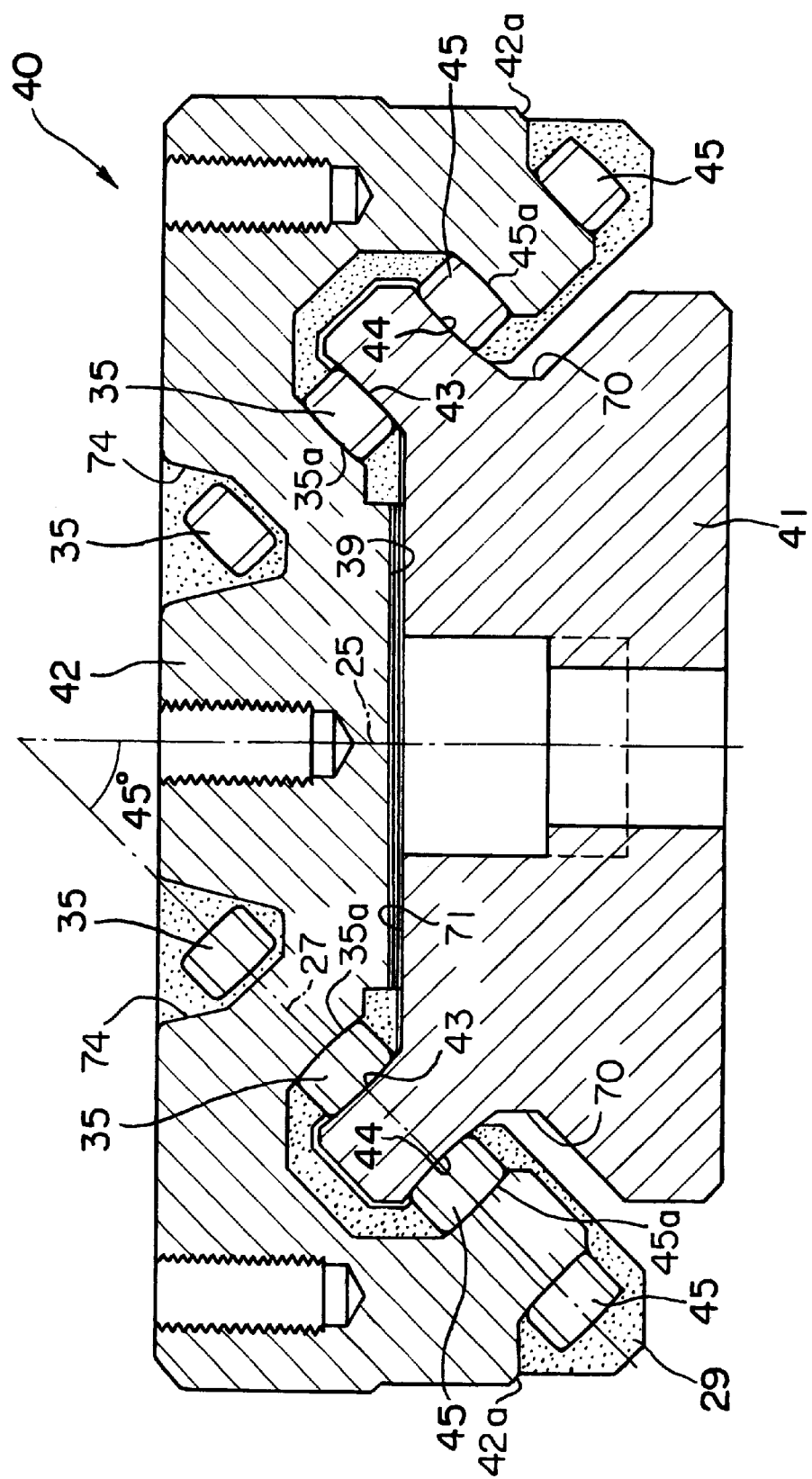
FIG. 5 is a cross-sectional view of a roller guiding apparatus in a second embodiment according to the present invention.

A roller guiding apparatus 40 shown in FIG. 5 differs from the roller guiding apparatus 20 shown in FIG. 2 in that a guide rail 41 has an upper surface 71 having recessed portions corresponding to upper rolling paths 43 and a flat portion between the recessed portions, and side surfaces 70 provided with concave rolling paths 44; and side rollers 45 each having a convex side surface 45a corresponding to the concave surfaces of the concave upper rolling paths 44 are disposed in roller circulating passages corresponding to the concave side rolling paths 44 of a moving block 42. Other parts of the roller guiding apparatus 40 are substantially the same in construction as the roller guiding apparatus 20 shown in FIG. 20.

Although the ability of the roller guiding apparatus 40 to cope with lateral force that acts on the moving block 42 is low as compared with that of the roller guiding apparatus 20 shown in FIG. 2, the ability is high enough to absorb errors in machining and combination of members.

When the moving block 42 is displaced laterally or tilted relative to the guide rail 41 in the roller guiding apparatus 40 shown in FIG. 5, skirts 42a of the moving block 42 bend slightly outward. Consequently, satisfactory contact between the side rollers 45 and the side rolling paths 44 can be maintained and the side rollers 45 roll smoothly along the side rolling paths 44. Therefore, the side rollers 45 are not damaged even if the moving block 42 is displaced laterally or tilted.

Figure 6:
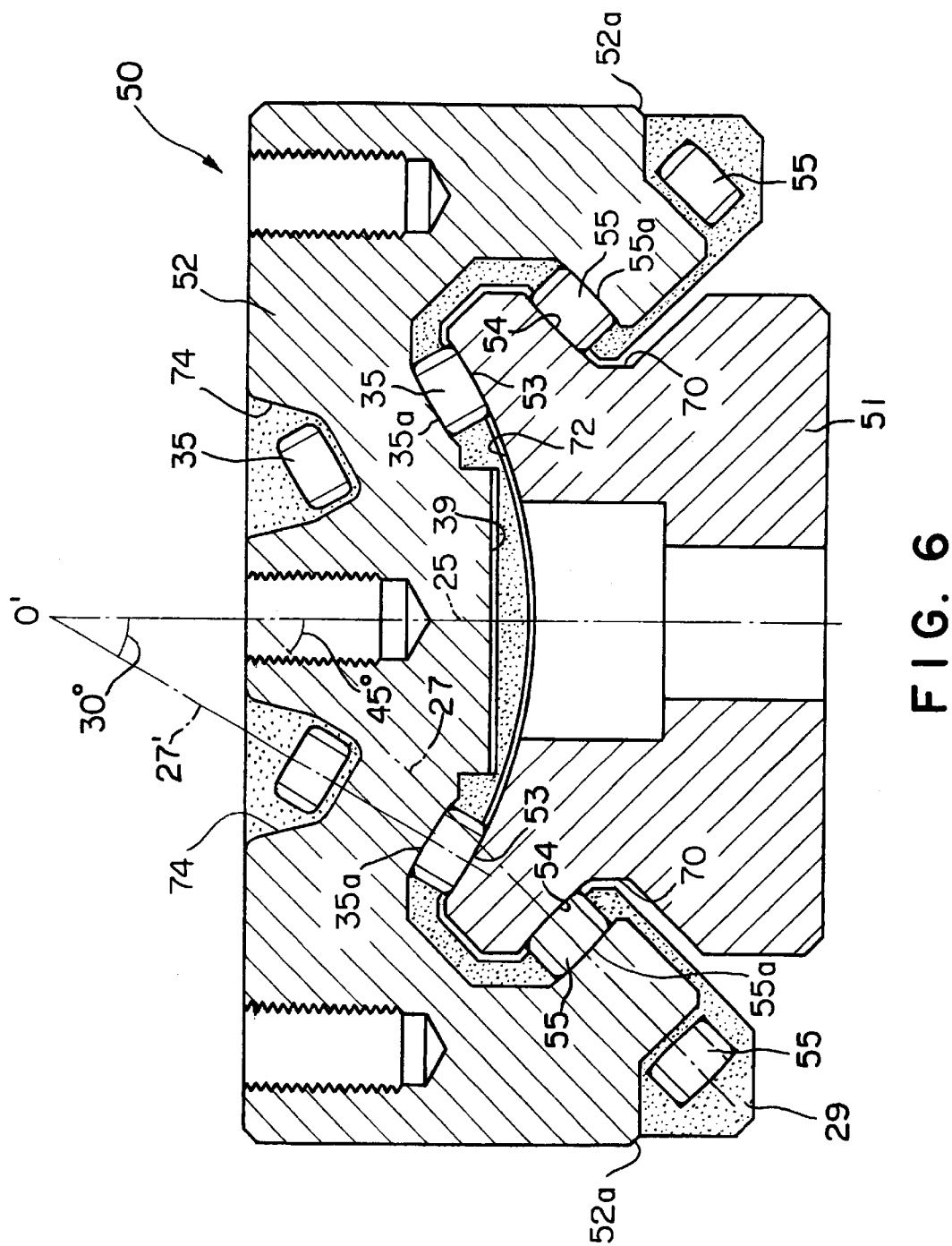
FIG. 6 is a cross-sectional view of a roller guiding apparatus in a third embodiment according to the present invention.

Referring to FIG. 6, the roller guiding apparatus 50 differs from the roller guiding apparatus 20 shown in FIG. 2 in that the side rolling paths 54 on the side of the guide rail 51 are formed as concave shape, and each of the side rollers 55, which roll on the concave side rolling paths 54, has a convex side surface 55a. The apparatus 50 also differs from the apparatus 20 in that the upper rolling path 53 on the upper surface of the guide rail 51 is located in the inclined plane 27' which is inclined at 30° to the longitudinal middle plane 25. In other words, each of the rotational axes of the upper roller 35 is inclined downward toward the longitudinal middle plane 25 at an angle of 30° to the plane perpendicular to the plane 25. The center of the arc, which constitutes the upper surface 72 of the guide rail 51, is included in the plane 27'.

Although the ability of the roller guiding apparatus 50 shown in FIG. 6 to cope with lateral force that acts on a moving block 52 is substantially equal to that of the roller guiding apparatus 20 shown in FIG. 2, top load is large and lifting load is small as compared with those on the roller guiding apparatus 20 shown in FIG. 2. The roller guiding apparatus 50 shown in FIG. 6 is capable of controlling vertical load and lateral load on the moving block 52 at different ratio.

In the roller guiding apparatus 50 shown in FIG. 6, when the moving block 52 is displaced laterally or tilted relative to a guide rail 51, the skirts 52a of the moving block 52 bend slightly outward. Consequently, the side rollers 55 are maintained in satisfactory contact with side rolling paths 54 and the side rollers 55 roll smoothly along the side rolling paths 54. Accordingly, the side rollers 55 are not damaged even if the moving block 52 is displaced laterally or tilted.

Figure 7:
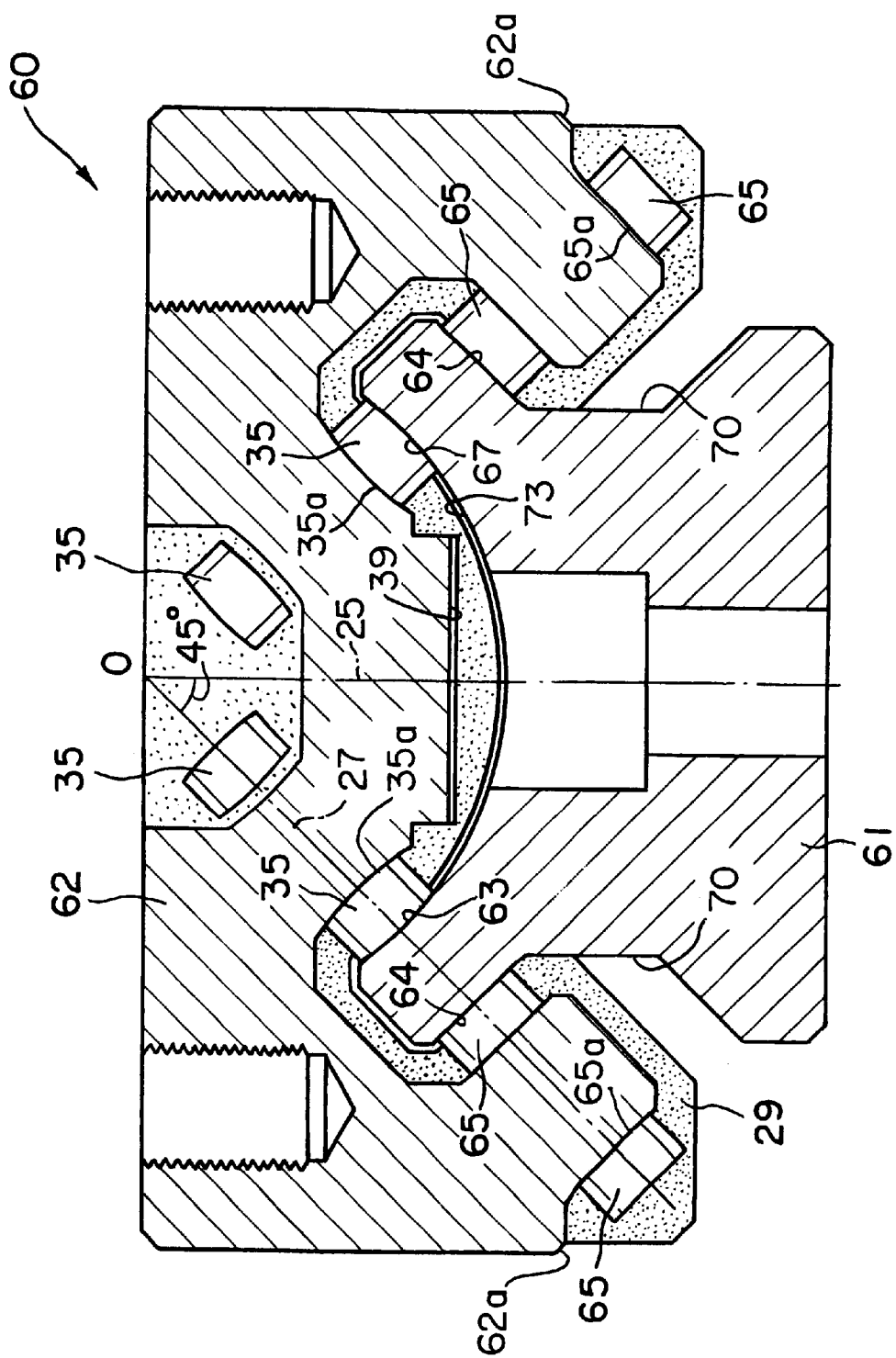
FIG. 7 is a cross-sectional view of a roller guiding apparatus in a fourth embodiment according to the present invention.
Figure 8:
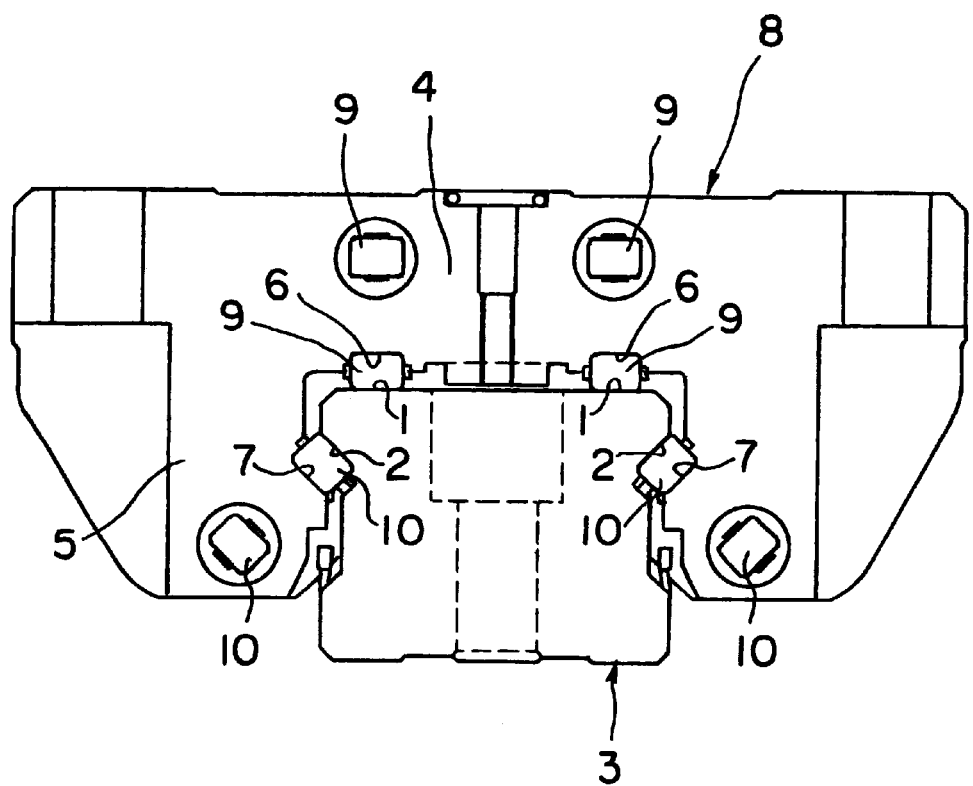
FIG. 8 is a cross-sectional view of a roller guiding apparatus as a related art.

Referring to FIG. 7, rolling paths 63 formed in the upper surface 73 of a guide rail 61 included in a roller guiding apparatus 60 are similar to the rolling paths 23 formed on the guide rail 21 of the roller guiding apparatus 20 shown in FIG. 2. However, side rolling paths 64 formed in the side surfaces 70 of the guide rail 61 are flat, and rollers 65 that are supported on a moving block 62 and roll along the side rolling paths 64 are cylindrical rollers.

Although the ability of the roller guiding apparatus 60 shown in FIG. 7 to cope with lateral force that acts on the moving block 62 is low as compared with that of the roller guiding apparatus 20 shown in FIG. 2, the manufacturing cost of the roller guiding apparatus 60 is lower than that of the roller guiding apparatus 20.

When the moving block 62 of the roller guiding apparatus 60 shown in FIG. 7 is displaced laterally or tilted relative to the guide rail 61, skirts 62a of the moving block 62 bend slightly outward. Consequently, satisfactory contact between the side rollers 65 and the side rolling paths 64 can be maintained and the side rollers 65 roll smoothly along the side rolling paths 64. Therefore, the side rollers 65 are not damaged even if the moving block 62 is displaced laterally or tilted.

As is apparent from the foregoing description, according to the present invention, the pair of concave upper rolling paths declining toward the middle portion of the guide rail with respect to width are formed in the opposite side regions of the upper surface of the guide rail. The plurality of upper rollers each having a convex side surface arranged in rows on the moving block roll along the pair of upper rolling paths. Therefore, even if the guide rail meanders slightly due to a positional error, the moving block is displaced laterally in a limited range relative to the guide rail, so that the smooth movement of the moving block can be insured.

What is claimed is:

1. A roller guiding apparatus comprising:
   a guide rail having an upper surface, side surfaces, a pair of upper rolling paths formed in opposite side regions of the upper surface, and a pair of side rolling paths formed in the side surfaces, the upper rolling paths being formed as a pair of concave surfaces declining toward a middle portion of the guide rail with respect to a width, the concave surfaces extending along arcs of a common circle;
   a moving block provided with a groove receiving therein the guide rail, the moving block being mounted on the guide rail so as to be able to move along the guide rail;
   a plurality of upper rollers arranged in rows on the moving block so as to roll along the upper rolling paths, each of the upper rollers having a convex side surface; and
   a plurality of side rollers arranged in rows on the moving block so as to roll along the side rolling paths.

2. The roller guiding apparatus according to claim 1, wherein the side rolling paths are formed as a pair of convex surfaces extending along arcs of a common circle, and each of the side rollers has a concave side surface.

3. The roller guiding apparatus according to claim 2 further comprising: upper retainers for retaining the upper rollers in rows, and side retainers for retaining the side rollers in rows.

4. The roller guiding apparatus according to claim 3 further comprising: a retainer holding member formed on a lower portion of the moving block, the retainer holding member having spaces formed at positions corresponding to the upper rolling paths to receive the upper rollers retained by the upper retainers therein and spaces formed at positions corresponding to the side rolling paths to receive the side rollers retained by the side retainers therein.

5. The roller guiding apparatus according to claim 1, wherein each of rotating axes of the upper rollers is inclined downward toward a longitudinal middle plane passing the middle portion of the guide rail at an angle of 45° to a plane perpendicular to the longitudinal middle plane.

6. The roller guiding apparatus according to claim 5, wherein each of rotating axes of the side rollers is inclined downward toward the longitudinal middle plane at an angle of 45° to a plane perpendicular to the longitudinal middle plane.

7. The roller guiding apparatus according to claim 6, wherein the upper rollers and the side rollers are disposed opposite to each other.

8. The roller guiding apparatus according to claim 1, wherein the side rolling paths are formed as a pair of concave surfaces, and each of the side rollers having a convex side surface.

9. The roller guiding apparatus according to claim 8 further comprising: upper retainers for retaining the upper rollers in rows, and side retainers for retaining the side rollers in rows.

10. The roller guiding apparatus according to claim 9 further comprising: a retainer holding member formed on a lower portion of the moving block, the retainer holding member having spaces formed at positions corresponding to the upper rolling paths to receive the upper rollers retained by the upper retainers therein and spaces formed at positions corresponding to the side rolling paths to receive the side rollers retained by the side retainers therein.

11. The roller guiding apparatus according to claim 8, wherein each of rotating axes of the upper rollers is inclined downward toward a longitudinal middle plane passing the middle portion of the guide rail at an angle of 45° to a plane perpendicular to the longitudinal middle plane.

12. The roller guiding apparatus according to claim 11, wherein each of rotating axes of the side rollers is inclined downward toward the longitudinal middle plane at an angle of 45° to a plane perpendicular to the longitudinal middle plane.

13. The roller guiding apparatus according to claim 12, wherein the upper rollers and the side rollers are disposed opposite to each other.

14. The roller guiding apparatus according to claim 8, wherein each of rotating axes of the upper rollers is inclined downward toward a longitudinal middle plane passing the middle portion of the guide rail at an angle of 30° to a plane perpendicular to the longitudinal middle plane.

15. The roller guiding apparatus according to claim 14, wherein each of rotating axes of the side rollers is inclined downward toward the longitudinal middle plane at an angle of 45° to a plane perpendicular to the longitudinal middle plane.

16. The roller guiding apparatus according to claim 15, wherein the upper rollers and the side rollers are disposed opposite to each other.

17. The roller guiding apparatus according to claim 1, wherein the side rolling paths are formed as a pair of flat planes inclined downward toward a longitudinal middle plane passing the middle portion of the guide rail, and each of the side rollers has a straight side surface.

18. The roller guiding apparatus according to claim 17 further comprising: upper retainers for retaining the upper rollers in rows, and side retainers for retaining the side rollers in rows.

19. The roller guiding apparatus according to claim 18 further comprising: a retainer holding member formed on a lower portion of the moving block, the retainer holding member having spaces formed at positions corresponding to the upper rolling paths to receive the upper rollers retained by the upper retainers therein, and spaces formed at positions corresponding to the side rolling paths to receive the side rollers retained by the side retainers therein.

20. The roller guiding apparatus according to claim 17, wherein each of rotating axes the upper rollers is inclined downward toward a longitudinal middle plane the middle portion of the guide rail at an angle of 45° to a plane perpendicular to the longitudinal middle plane.

21. The roller guiding apparatus according to claim 20, wherein each of rotating axes of the side rollers is inclined downward toward the longitudinal middle plane at an angle of 45° to a plane perpendicular to the longitudinal middle plane.

22. The roller guiding apparatus according to claim 21, wherein the upper rollers and the side rollers are disposed opposite to each other.

* * * * *